3,642,889
PRODUCTION OF LACTIC ACID
Rolf Platz, Mannheim, Heinz Nohe, Ludwigshafen (Rhine), and Toni Dockner, Meckenheim, Pfalz, Germany, assignors to Badische Anilin- & Soda-Fabrik Aktiengesellschaft, Ludwigshafen (Rhine), Germany
No Drawing. Filed Nov. 1, 1966, Ser. No. 591,130
Claims priority, application Germany, Nov. 12, 1965, B 84,477
Int. Cl. C07c 59/08
U.S. Cl. 260—535 R
6 Claims

ABSTRACT OF THE DISCLOSURE

Process for producing lactic acid by the hydrolysis of lactic acid nitrate in which the lactic acid nitrate is reacted with more than twice its weight of water. It has been found that high yields of lactic acid can be obtained either from pure lactic acid nitrate or from the reaction product containing impurities as well as lactic acid nitrate.

---

This invention relates to a method for the production of lactic acid by hydrolysis of lactic acid nitrate.

It is known from U.S. Pat. specification No. 2,847,464 that lactic acid is obtained by reaction of propylene with nitrogen dioxide and nitric acid. The esters of lactic acid and nitric acid obtained as byproducts are said to be readily converted into lactic acid if desired by hydrolysis. By the said method however the yield is only 27.8%.

It is known from Printed German application No. 1,192,179 that lactic acid nitrate is obtained in a yield of 85% by reaction of propylene with nitrogen dioxide and oxygen. Conversion of the lactic acid nitrate thus obtained into lactic acid by hydrolysis however gives only low yields.

It is an object of the present invention to provide a method of preparing lactic acid by hydrolysis of lactic acid nitrate according to which high yields of lactic acid are obtained and in which lactic acid is obtained having a high purity, in particular having a purity suitable for foodstuffs.

These and other objects are achieved in a process for the production of lactic acid by hydrolysis of lactic acid nitrate which comprises reacting lactic acid nitrate with more than twice its weight, advantageously from five to fifteen times its weight of water.

Hydrolysis of lactic acid nitrate is a reaction catalyzed by acid. Since nitric acid is liberated at the same time, it was to be expected that hydrolysis would proceed far more rapidly when using small amounts of water, the reaction solution forming having a higher acid concentration if small amounts of water are used. Surprisingly, however, when half the weight of water (equivalent to 6.5 times the equimolar amount) is used, yields of only 36% are achieved, whereas for example by using ten times the weight of water (equivalent to 130 times the equimolar amount) yields of more than 90% are achieved.

The starting material may be lactic acid nitrate in pure form or preferably as a crude product. Crude lactic acid nitrate obtainable from propylene, nitrogen dioxide and oxygen, for example according to the process of printed German application No. 1,192,179, may be used directly without purification. It is advantageous to remove dissolved oxides of nitrogen from the crude starting material by applying a vacuum or by blowing in gases, preferably propylene or oxygen. It is particularly advantageous to treat the crude lactic acid nitrate with oxygen, particularly countercurrent, prior to the hydrolysis. This not only removes the small amounts of dissolved nitrogen oxides but at the same time small amounts of byproducts resulting from incomplete reaction are oxidized to lactic acid nitrate so that the total yield is higher and a purer product is obtained.

More than twice the weight of water, with reference to lactic acid nitrate, is used for hydrolysis. It is particularly advantageous to use five to fifteen times the weight of water. When using less water, only small yields are obtained, while with larger amounts strongly diluted solutions are obtained which can only be processed with difficulty.

Hydrolysis is in general carried out in the temperature range of from 0° to 150° C., preferably at room temperature or elevated temperature, for example from 60° to 150° C. It is preferred to mix lactic acid nitrate and water at a low temperature and to complete the reaction by cautious heating. When using crude lactic acid nitrate, it is preferred to separate water-insoluble constituents prior to the heating. In general, reaction periods of thirty minutes to twenty hours are required. The progress of the reaction may easily be followed by titrating samples of the reaction mixture. The optimum temperature and residence time may easily be determined by experiment. Hydrolysis may be carried out continuously or batchwise.

The reaction product obtained is an aqueous solution essentially consisting of lactic acid and nitric acid. It is advantageous to extract this solution with an organic solvent which is not miscible with water, such as benzene, toluene, heptane, nitrobenzene, chloroform or methylene chloride. Impurities, such as nitro compounds, are thus removed from the aqueous solution.

Separation of the nitric acid is advantageously carried out by means of liquid anion exchangers. Liquid anion exchangers are high boiling point secondary or tertiary amines which are not miscible with water, as for example diisooctylamine, ditridecylamine, dodecenyl dodecylamine or triisooctylamine. These amines bind the stronger nitric acid by formation of salts and the salts dissolve in the organic phase. To increase the separation effect it is advantageous to dilute the liquid anion exchanger with a solvent which is not miscible with water, for example benzene, toluene or heavy naphtha. The amount of amine used should at least be equivalent to the amount of nitric acid. Extraction is advantageously carried out continuously in an extraction column, the aqueous and organic phase being passed countercurrent to each other.

The aqueous lactic acid solution freed from nitric acid is processed to lactic acid in conventional ways, for example brought to the desired strength by concentration under subatmospheric pressure and subjected to purification, for example by treatment with active carbon. Lactic acid which may be used for foodstuffs is obtained. The nitric acid may be removed from the organic phase as ammonium nitrate by treating it with ammonia. The liquid amine may be used again for extraction without purification.

Separation of nitric acid from the aqueous lactic acid solution may also be effected by azeotropic distillation with acetic acid. For this purpose the aqueous solution is first concentrated so that the lactic acid content is 20 to 50% by weight and then 0.2 times to twice the weight of acetic acid (on the concentrated aqueous solution) is added. The whole is then subjected to fractional distillation at a top temperature of about 100° to 105° C. until the distillate is free from nitric acid. The distillate may be separated into acetic acid, water and nitric acid by conventional methods, for example by partial neutralisation and distillation. It is advantageous to return water and acetic acid to the mixture during the distillation so that a minimum water content of 10% by weight and an acetic acid content of 20% by weight are maintained. In general at least 1 kg. of acetic acid, advantageously 2 to 4 kg. of acetic acid, has to be vaporized to purify 1 kg. of lactic acid.

The distillation residue free from nitric acid is substantialy freed from excess acetic acid by distillation, water is added (for example once to ten times the weight), the whole heated for some hours at 100° C. to hydrolyze traces of acetyllactic acid, the solution decolorized with active carbon and concentrated. The lactic acid thus obtained is already very pure. It may easily be distilled at subatmospheric pressure. The distilled product fulfills the purity requirements of the German Pharmacopoeia 6.

The invention is illustrated by the following examples.

EXAMPLE 1

12 liters of propylene, 24 liters of nitrogen monoxide and 36 liters of oxygen are passed per hour through a spiral-shaped tube of V2A-steel having a diameter of 4 mm. and a volume of 100 ccm. which is kept at +8° C. in a cooling bath; the propylene is supplied separately and the nitrogen monoxide and oxygen are supplied as a mixture. The gases are precooled to +5° C. The reaction gases flow through the spiral downwardly. The residence time in the reaction chamber is 4.75 seconds. The liquid reaction product flows from the tube into a flask kept at 0° C. Then the offgas flows through a cooler filled with Raschig rings which is kept at 15° C., a further small amount of reaction product thus being separated. The offgas leaving the cooler is colorless and the propylene content is less than 1% by volume. The reaction product (consisting mainly of lactic acid nitrate) is passed to a second flask wherein nitrogen oxides are removed by applying a vacuum. The temperature of the reaction product is preferably kept at 15° to 20° C. because explosive decompositions may occur at higher temperature 474 g. of reaction product is obtained after seven hours. After it has been diluted with 3000 g. of water, about 10 g. of an insoluble oil separates out and is removed. The solution is then heated for twelve hours at 100° C. Analysis of the cooled aqueous solution gives a lactic acid content of 8.15% by weight, i.e. at a total weight of the aqueous solution of 3460 g., 281 g. of lactic acid has been formed, equal to 83.1% of the theory on the propylene used. The nitric acid content is 6.0% by weight.

1000 ccm. of the hydrolysis solution is extracted with 100 ccm. of nitrobenzene. The aqueous phase is then shaken on a vibrating machine for twenty minutes with 1000 ccm. of a solution of 150 ccm. of a liquid anion exchanger known under the trade name "Amberlite LA 1" (a mixture of secondary amines having twenty-four to twenty-seven carbon atoms—dodecenyl tertiary alkylamine) and 750 ccm. of heavy naphtha. After the extraction, the lactic acid content of the aqueous solution is 8.10% by weight and the nitric acid content is 2.04% by weight. The aqueous phase is again shaken with the same amount of organic phase and analyzed. The lactic acid content is 8.04% by weight, while the nitric acid content is less than 0.01% by weight. The lactic acid loss in the extraction is thus about 2%. Lactic acid is obtained in the conventional syrupy consistency by concentrating the solution. The total yield of lactic acid is 81.4% of the theory on the propylene used.

The organic phase containing nitric acid is regenerated by shaking it with 500 ccm. of 10% aqueous ammonia solution and used again for extraction of nitric acid.

The yields of lactic acid set out in the following table are obtained by hydrolyzing under analogous conditions but with varying amounts of water.

TABLE

| Ratio by weight of water: lactic acid nitrate (crude product) | Yield of lactic acid in percent of the theory, with reference to propylene |
| --- | --- |
| 0.5:1 | 35 |
| 1:1 | 45 |
| 2:1 | 52 |
| 4:1 | 64 |
| 7:1 | 75 |
| 10:1 | 82 |
| 15:1 | 76 |

EXAMPLE 2

48 liters of propylene, 144 liters of nitrogen monoxide and 144 liters of oxygen are passed each hour through a tubular heat exchanger having a capacity of 1520 ccm. which is kept with a cooling brine at 8° to 10° C., the propylene being supplied separately and the nitrogen monoxide and oxygen as a mixture. The gases are precooled to 5° C. The reaction gases flow through the tubular heat exchanger downwardly. The residence time in the reaction chamber is 16 seconds.

The liquid reaction product obtained is freed from dissolved nitrogen oxides by blowing in oxygen. For this purpose the liquid reaction product is passed downwardly through a tube filled with Raschig rings which is kept at 10° to 15° C. A stream of oxygen at the rate of 100 liters per hour is passed upwardly countercurrent. The oxygen laden with nitrogen monoxide and nitrogen dioxide has 44 l./h. of oxygen and 80 to 90 l./h. of nitrogen monoxide added to it and it is then reused for reaction with propylene. 282.5 g. per hour of crude lactic acid nitrate is obtained.

565 g. of the crude product obtained has 4000 g. of water added to it; about 10 g. of an insoluble oil thus separates out and is removed. The solution is then heated for twelve hours at 100° C.

Analysis of the cooled aqueous solution gives a lactic acid content of 7.8% by weight, i.e. at a total weight of the aqueous solution of 4483 g., 350 g. of lactic acid is formed, equivalent to 91% of the theory on the propylene used.

EXAMPLE 3

48 liters of propylene, 144 liters of nitrogen monoxide and 144 liters of oxygen are supplied per hour to a tubular heat exchanger having a capacity of 1520 ccm. which is kept at +8° to 10° C. with a cooling brine. The gases are precooled to 5° C. The reaction gases flow through the tubular heat exchanger downwardly.

The liquid reaction product obtained is freed from dissolved nitrogen oxides by blowing in oxygen. For this purpose the liquid reaction product is passed downwardly through a tube filled with Raschig rings which is kept at 10° to 15° C. and a current of oxygen of 100 liters per hour is passed upwardly countercurrent. The oxygen laden with nitrogen monoxide and nitrogen dioxide has 44 liters per hour of oxygen and 80 to 90 liters per hour of nitrogen monoxide added to it and it is used again for reaction with propylene. 282.5 g. of crude lactic acid nitrate is obtained per hour.

4000 g. of water is added to 565 g. of the crude product obtained and heated for twelve hours at 100° C.

Analysis of the cooled aqueous solution gives a nitric acid content of 3.5% by weight and a lactic acid content of 7.8% by weight, i.e. at a total weight of the aqueous solution of 4483 g. 350 g. of lactic acid is formed, equivalent to 91% of the theory on the propylene used.

The aqueous solution of 4483 g. is concentrated in vacuo to 2000 g. and 2000 g. of acetic acid is added. This mixture is fractionally distilled over a packed column having a length of 1 metre and a diameter of 30 mm. until the residue is free from nitric acid. The boiling point of the mixture passing over the top (consisting of 30 to 35% by weight of acetic acid, 1.5 to 3% by weight of nitric acid, the remainder being water) is 100° to 101° C. at a pressure of 760 mm. Hg.

Acetic acid is distilled off in vacuo from the residue consisting mainly of acetic acid, lactic acid and acetyllactic acid.

The pale yellow syrupy concentrate has five times its weight of water added to it and it is heated to 100° C. for two hours. The aqueous solution is cooled, treated with 1 to 2% of carbon and concentrated. The concentrate, which is now colorless, is distilled at a pressure of 0.1 mm. Hg and distilled at a boiling point of 82° to 87° C.

290 g. (75% of the theory on propylene used) of anhydrous, very pure lactic acid is obtained which is suitable for use in foodstuffs.

We claim:

1. A process for the production of lactic acid by the hydrolysis of lactic acid nitrate which comprises: mixing lactic acid nitrate with more than twice its weight of water, allowing said lactic acid nitrate and said water to react to form an aqueous solution containing lactic acid and nitric acid, and separating the lactic acid from the nitric acid.

2. A process for the production of lactic acid by the hydrolysis of lactic acid nitrate which comprises: mixing lactic acid nitrate with more than twice its weight of water, allowing said lactic acid nitrate and said water to react at a temperature of from 0 to 150° C. to form an aqueous solution containing lactic acid and nitric acid, and separating the lactic acid from the nitric acid.

3. A process as claimed in claim 2 wherein the weight of water is five to fifteen times that of the lactic acid nitrate.

4. A process as claimed in claim 2 in which lactic acid nitrate which has been obtained by reaction of propylene with nitrogen dioxide and oxygen is used.

5. A process for the production of lactic acid from a reaction mixture formed by reacting propylene with nitrogen dioxide and oxygen, said reaction mixture containing lactic acid nitrate which comprises: treating the crude lactic acid nitrate mixture with oxygen to remove dissolved oxides of nitrogen, mixing the reaction mixture with water, the amount of water by weight being at least twice the weight of the lactic acid nitrate, heating the reaction mixture at a temperature of from 60 to 150° C. to hydrolyze said lactic acid nitrate, mixing an organic solvent with the aqueous reaction mixture to remove nitro compounds, said organic solvent being one which is not miscible with water, separating nitric acid from the aqueous solution containing nitric acid and lactic acid by contacting said solution with a liquid anion exchanger, and thereafter separating lactic acid from said aqueous lactic acid solution.

6. A process as in claim 5 wherein separation of nitric acid from the aqueous lactic acid solution is effected by azeotropic distillation with acetic acid.

References Cited

UNITED STATES PATENTS

| 2,847,453 | 8/1958 | Gardner et al. | 260—533 XR |
| 2,847,464 | 8/1958 | Robertson et al. | 260—533 |
| 2,847,465 | 8/1958 | Robertson et al. | 260—533 |

FOREIGN PATENTS

| 1,192,179 | 5/1965 | Germany | |
| 1,196,181 | 7/1965 | Germany | 260—533 |

LORRAINE A. WEINBERGER, Primary Examiner

P. J. KILLOS, Assistant Examiner

U.S. Cl. X.R.

260—533 R